May 23, 1961 R. R. COOK 2,985,474
MECHANICAL MOVEMENT DEVICE
Filed Oct. 15, 1958
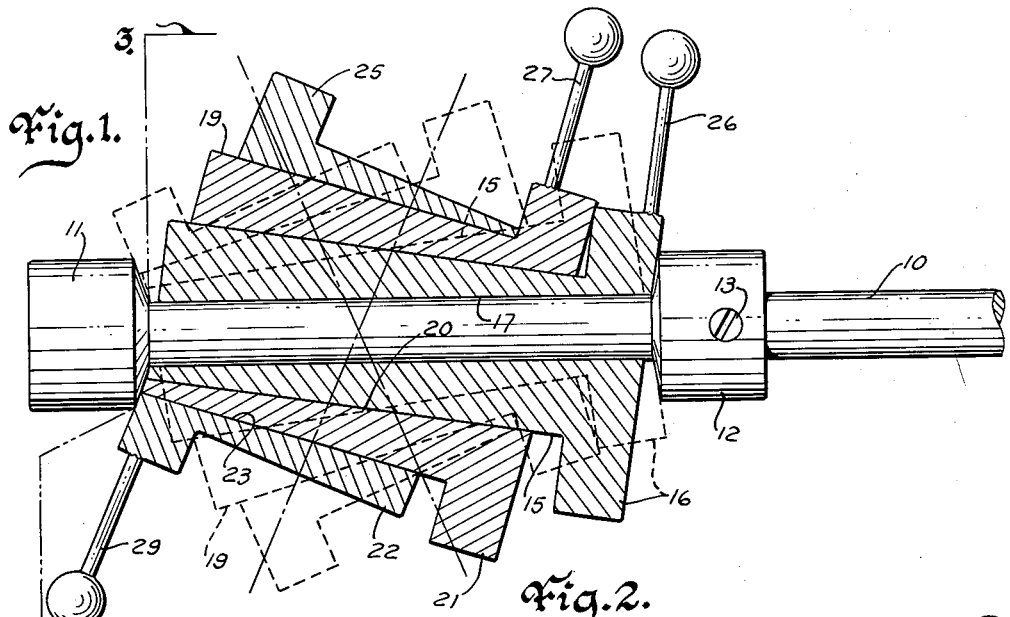
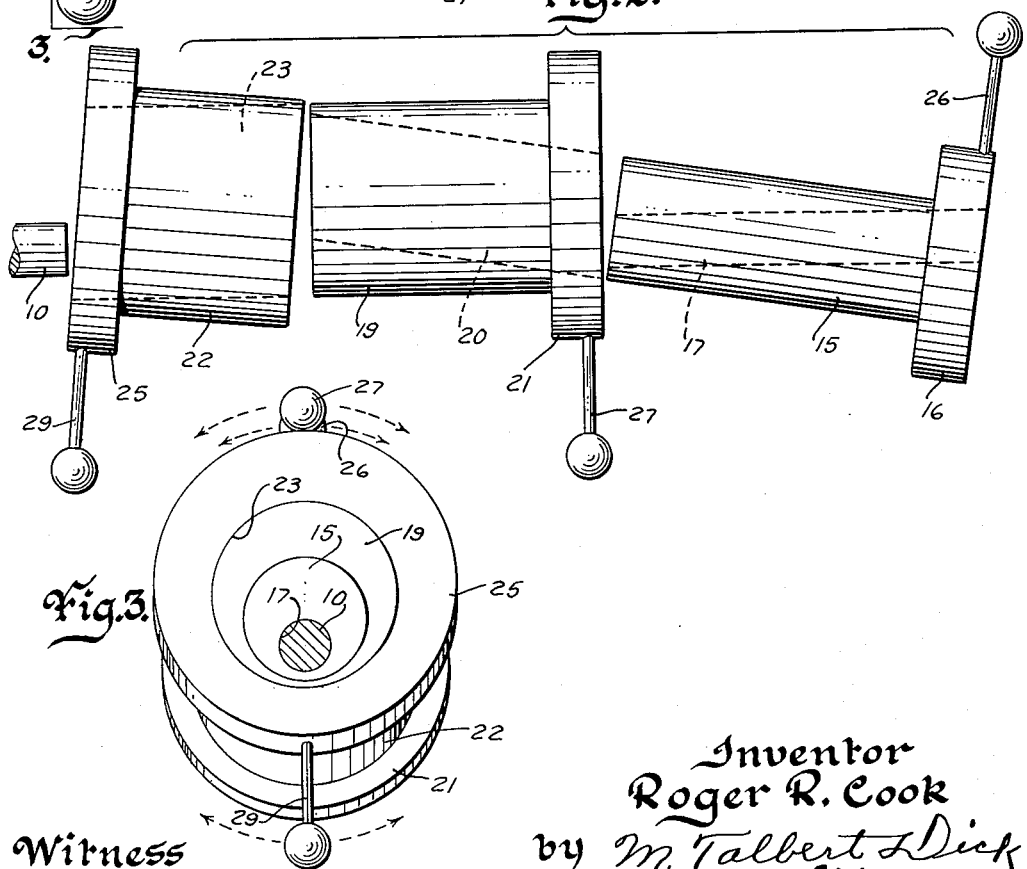
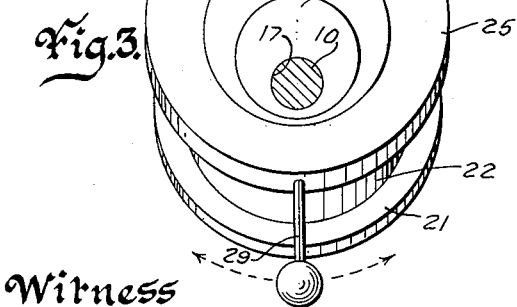
Witness
Edward P. Seeley
Inventor
Roger R. Cook
by M. Talbert Dick
Attorney United States Patent Office 2,985,474
Patented May 23, 1961

2,985,474
MECHANICAL MOVEMENT DEVICE
Roger R. Cook, 2202 S. Union St., Des Moines, Iowa
Filed Oct. 15, 1958, Ser. No. 767,371
6 Claims. (Cl. 287—52)

This invention relates to a mechanical movement and more particularly to a method of and means for changing the relative positions of three associated rotary members. The invention for certain purposes is an improvement over the structure shown in my co-pending application Serial Number 751,484 now Patent No. 2,926,032 filed July 28, 1958, on a Method of and Means for Changing the Relative Angle of Rotary Members.

There are many kinds of machines, instruments, equipment, tools and devices that require the adjustable angle positioning of various parts relative to each other. Such necessary adjustments often require a plurality of independent compensating adjustments. In many situations, the means is costly and most difficult of manual manipulation. Also many such devices are highly inaccurate.

Therefore, one of the principal objects of my invention is to provide a mechanical movement that permits the relative angle of the parts to be easily and smoothly changed.

A further object of this invention is to provide a mechanical movement that has a simple, quick positive adjustment.

A still further object of this invention is to provide a mechanical movement for progressively changing relative angles that is always in ratio to its movable adjusting means.

A still further object of this invention is to provide a mechanical movement that is highly accurate and thus capable of use on such devices as leveling means, delicate instruments, gauges and the like.

Still further objects of my invention are to provide a mechanical means that is economical in manufacture, durable in use and refined in appearance.

These and other objects will be apparent to those skilled in the art.

My invention consists in the construction, arrangement, and combination, of the various parts of the device, whereby the objects contemplated are attained as hereinafter more fully set forth, specifically pointed out in my claims, and illustrated in the accompanying drawings, in which:

Fig. 1 is a longitudinal sectional view of my device with broken lines illustrating relative adjustments;

Fig. 2 is an exploded view of the three principal moving parts of my device; and Fig. 3 is an end view of my mechanical device taken from line 3—3 of Fig. 1.

The three main movable portions of my device may be movably supported in any suitable manner but obviously at least one of the members must be supported. In the drawings I show the innermost member rotatably supported but it is understood that even the outermost movable member may be movably supported by suitable means. I have used the numeral 10 to designate a supporting shaft or like for a limiting head member 11. The numeral 12 designates a removable adjustable second space head on the shaft 10. This limiting head 12 may be secured against movement on the shaft 10 by the set screw 13.

The numeral 15 designates the inner movable member which is in the form of a cylindrical hub and it rotatably embraces the shaft 10 between the head 11 and head 12. On one end of the cylindrical axle hub 15 is a peripheral circular shoulder portion of flange 16. This inner member 15 is unique in that its bore 17 that embraces the shaft 10, extends at an angle to its longitudinal center as shown in Fig. 2. Furthermore, this bore 17 extends through the dead center of the member 15 between the two ends of the member 17 and therefore the exit of the shaft 10 from both ends of the member 15 will be at the side of the longitudinal center of the member 15 as shown by the broken lines in Fig. 2.

The numeral 19 designates a second cylindrical hub portion having a bore 20 that rotatably extends around the periphery of the inner movable member 15 as shown in Fig. 1. This bore 20 also extends at an angle to the longitudinal center of the member 19. Thus the bore 20 is concentric with the periphery of the inner hub member 15 but by the relative rotation of the members the cylindrical periphery of the cylindrical hub 19, when in certain positions of its rotation relative to the inner hub may well be centric with the periphery of the cylindrical periphery of the inner hub 15. On the other end there are certain positions where the periphery of the cylindrical hub 19 would be most concentric with the member 15. Any adjustment from one extreme to the other will be progressive merely by the relative rotation of the members. This is made possible by the structure of the cylindrical hub 19 being similar to that of the hub 15. Thus the two hubs may adjustably complement each other by relative rotation in one direction or the periphery of the hubs 15 and 19 may be far from being parallel with each other. Thus it is seen that the members 15 and 19 may be moved to positions where they complement each other or to positions where the periphery of the member 19 will be at relatively severe angles as compared to the longitudinal axis of the shaft 10. The numeral 21 designates a peripheral radially extending shoulder flange on one end of the member 19 and which is adjacent to and capable of contact with the shoulder flange 16 of the member 15.

The numeral 22 designates the third or outer movable member which also is in the form of a cylindrical hub having an enlarged bore 23 rotatably embracing the periphery of the intermediate cylindrical hub 19. This bore 23 also extends at an angle to the longitudinal center of the member 22. The member 22 is adjustably rotatably mounted on the hub 19 in the same similar manner that the hub 19 is rotatably mounted on the hub 15. The bore 20 in the hub 19 and the bore 23 in the hub 22 are similar to the bore 17 in the hub 15 in that they both cross the longitudinal center of their hub near the center of the length of their hub. The exiting of the shaft 10 from the member 15 and the exiting of the member 15 from the hub 19 and the exiting of the hub 19 from the hub 22 at a position in one side of the dead center of the various parts is shown in Fig. 3. By this arrangement severe relative angles of the hub portion 22 relative to the shaft 10 may be easily and quickly had by rotating the various members accordingly or as shown by broken lines in Fig. 1. The numeral 25 designates a radially extending peripheral shoulder flange on the cylindrical hub 22. Any suitable means, including power means, may be used for individually rotating the cylindrical hubs 15, 19 and 22. Obviously for many uses it would be desirable to manually control and rotate the hub members. In the drawings I show a handle 26 on the flange 16, a handle 27 on the flange 21 and a handle 29 on the flange 25. These handle members facilitate the holding and/or rotating of the cylindrical hub members. When in use any one or all three of the cylindrical hub members may be individually secured to members desiring to be adjustably moved. In the case of gun sights, transits and like, such mechanism or equipment would obviously be operatively secured to the cylindrical hub portion 22.

Some changes may be made in the construction and arrangement of my mechanical movement and method of effecting same without department from the real spirit and purpose of my invention, and it is my intention to cover by my claims, any modified forms of structure or use of mechanical equivalents which may be reasonably included within their scope.

I claim:

1. In a mechanical movement device, a shaft member, an inner hub member having a cylindrical periphery and a bore extending at an angle to its longitudinal axis; said bore of said inner hub member rotatably embracing said shaft, an intermediate hub member having a cylindrical periphery and a bore extending at an angle to its longitudinal axis; said bore of said intermediate hub member rotatably embracing the cylindrical periphery of the inner hub member, an outer hub member having a bore extending at an angle to its longitudinal axis; said bore of said outer hub member rotatably embracing the cylindrical periphery of said intermediate hub member, and a means for facilitating the independent rotation of each of said hub members relative to each other.

2. In a mechanical movement device, a shaft member, an inner hub member having a cylindrical periphery and a bore extending at an angle to its longitudinal axis; said bore of said inner hub member rotatably embracing said shaft, an intermediate hub member having a cylindrical periphery and a bore extending at an angle to its longitudinal axis; said bore of said intermediate hub member rotatably embracing the cylindrical periphery of the inner hub member, an outer hub member having a bore extending at an angle to its longitudinal axis; said bore of said outer hub member rotatably embracing the cylindrical periphery of said intermediate hub member, a means for facilitating the independent rotation of each of said hub members relative to each other, and a means on said shaft for limiting the sliding movement of said hub members in one direction.

3. In a mechanical movement device, a shaft member, an inner hub member having a cylindrical periphery and a bore extending at an angle to its longitudinal axis; said bore of said inner hub member rotatably embracing said shaft, an intermediate hub member having a cylindrical periphery and a bore extending at an angle to its longitudinal axis; said bore of said intermediate hub member rotatably embracing the cylindrical periphery of the inner hub member, an outer hub member having a bore extending at an angle to its longitudinal axis; said bore of said outer hub member rotatably embracing the cylindrical periphery of said intermediate hub member, and a means for facilitating the independent rotation of each of said hub members relative to each other; said bore of each of said hub members having its longitudinal center portion crossing the longitudinal center of the hub of which it is a part.

4. In a mechanical movement device, a shaft member, an inner hub member having a cylindrical periphery and a bore extending at an angle to its longitudinal axis; said bore of said inner hub member rotatably embracing said shaft, an intermediate hub member having a cylindrical periphery and a bore extending at an angle to its longitudinal axis; said bore of said intermediate hub member rotatably embracing the cylindrical periphery of the inner hub member, an outer hub member having a bore extending at an angle to its longitudinal axis; said bore of said outer hub member rotatably embracing the cylindrical periphery of said intermediate hub member, a stop member on said shaft, a peripheral shoulder flange on said inner hub member and in contact with said stop, a peripheral shoulder flange on said intermediate hub and in contact with the peripheral shoulder flange of said inner hub member, and a means for facilitating the independent rotation of each of said hub members relative to each other.

5. In a mechanical movement device, a shaft member, an inner hub member having a cylindrical periphery and a bore extending at an angle to its longitudinal axis; said bore of said inner hub member rotatably embracing said shaft, an intermediate hub member having a cylindrical periphery and a bore extending at an angle to its longitudinal axis; said bore of said intermediate hub member rotatably embracing the cylindrical periphery of the inner hub member, an outer hub member having a bore extending at an angle to its longitudinal axis; said bore of said outer hub member rotatably embracing the cylindrical periphery of said intermediate hub member, an adjustable stop member on said shaft, a peripheral shoulder flange on said inner hub member and in rotatable independent contact with said stop, a peripheral shoulder flange on said intermediate hub and in rotatable independent contact with the peripheral shoulder flange of said inner hub member for independently rotating each of said hub members relative to each other.

6. In a mechanical movement device, a shaft member, an inner hub member having a cylindrical periphery and a bore extending at an angle to its longitudinal axis; said bore of said inner hub member rotatably embracing said shaft, an intermediate hub member having a cylindrical periphery and a bore extending at an angle to its longitudinal axis; said bore of said intermediate hub member rotatably embracing the cylindrical periphery of the inner hub member, an outer hub member having a bore extending at an angle to its longitudinal axis; said bore of said outer hub member rotatably embracing the cylindrical periphery of said intermediate hub member, a stop member on said shaft and adjacent to one end of said inner hub member, a second stop member on said shaft member adjacent the other end of said inner hub member, and means for facilitating the independent rotation of each of said hub members relative to each other.

References Cited in the file of this patent

UNITED STATES PATENTS 1,819,715     Le Bret _____ Aug. 18, 1931

FOREIGN PATENTS 931,490     France _____ Oct. 27, 1947
652,329     Germany _____ Oct. 29, 1937